US012636940B2

(12) United States Patent　　(10) Patent No.: US 12,636,940 B2
Saito　　(45) Date of Patent: May 26, 2026

(54) VEHICLE AIR CONDITIONING SYSTEM

(71) Applicant: NGK INSULATORS, LTD., Nagoya City (JP)

(72) Inventor: Hirotaka Saito, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 155 days.

(21) Appl. No.: 18/439,974

(22) Filed: Feb. 13, 2024

(65) Prior Publication Data

US 2024/0317026 A1　　Sep. 26, 2024

(30) Foreign Application Priority Data

Mar. 22, 2023　(JP) ................................. 2023-045821

(51) Int. Cl.
B60H 3/02　　(2006.01)

(52) U.S. Cl.
CPC ..................................... B60H 3/024 (2013.01)

(58) Field of Classification Search
CPC .............. B60H 3/024; B60H 2003/028; B60H 2003/0691
See application file for complete search history.

(56) References Cited

U.S. PATENT DOCUMENTS

| | | | |
|---|---|---|---|
| 2005/0129591 A1* | 6/2005 | Wei ...................... | B60H 3/0608 |
| | | | 422/186 |
| 2009/0277202 A1* | 11/2009 | Viegas ................... | B60H 3/024 |
| | | | 62/323.3 |
| 2017/0239609 A1 | 8/2017 | Luisman et al. | |
| 2024/0227506 A1* | 7/2024 | Shinoda ............... | B60H 1/2225 |
| 2024/0238718 A1* | 7/2024 | Saito ....................... | B01J 35/33 |
| 2024/0239153 A1* | 7/2024 | Hamada ................ | F24H 3/0429 |
| 2024/0270055 A1* | 8/2024 | Miyairi .............. | B60H 1/00849 |

FOREIGN PATENT DOCUMENTS

| | | |
|---|---|---|
| JP | 2004-291863 A | 10/2004 |
| JP | 2017-043309 A | 3/2017 |
| JP | 2017-528316 A | 9/2017 |
| JP | 2020-104774 A | 7/2020 |
| JP | 2020-196406 A | 12/2020 |

\* cited by examiner

*Primary Examiner* — Marc E Norman
(74) *Attorney, Agent, or Firm* — BURR PATENT LAW, PLLC

(57)　　ABSTRACT

A vehicle air conditioning system includes: an air conditioning duct through which air can flow; an evaporator disposed in the air conditioning duct; and a humidity control device disposed on an upstream side of the evaporator in the air conditioning duct. The humidity control device includes: a honeycomb structure having an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property; and a dehumidifying layer formed on a surface of each of the partition walls.

12 Claims, 3 Drawing Sheets

VEHICLE AIR CONDITIONING SYSTEM

FIELD OF THE INVENTION

The present invention relates to a vehicle air conditioning system.

CROSS REFERENCE TO RELATED APPLICATIONS

The present invention claims the benefit of priority to Japanese Patent Application No 2023-045821 filed on Mar. 22, 2023 with the Japanese Patent Office, the entire contents of which are incorporated herein by reference in its entirety.

BACKGROUND OF THE INVENTION

In various types of vehicles such as automobiles, there are increasing requirements for improvement of vehicle interior environment. Specific requirements include reduction of an amount of $CO_2$ in the vehicle interior to suppress driver's drowsiness, control of humidity in the vehicle interior, and removal of harmful volatile components such as odor components and allergy-causing components in the vehicle interior. The effective measure for such requirements includes ventilation, but the ventilation causes a large loss of heater energy in winter, leading to a decreased energy efficiency in winter. In particular, a battery electric vehicle (BEV) has a problem that its cruising range is significantly reduced due to its energy loss.

As a method for solving the above problem, an air conditioning system for vehicles is known in which components to be removed such as $CO_2$ and water vapor in the air in the vehicle interior are trapped by a functional material such as an adsorbent, and the components to be removed are then allowed to react or desorbed by heating to discharge them to the outside of the vehicle and regenerate the functional material (e.g., Patent Literatures 1 and 2).

Furthermore, in the vehicle air conditioning system, dehumidification within the vehicle interior is performed by an evaporator disposed in the air conditioning duct. The evaporator can cool the air to its dew point or lower to condense moisture in the air and discharge it to a vehicle exterior. However, since the dew condensation tends to occur in the evaporator, mold also tend to grow due to the adhesion of dust and the like. If the air flows through the evaporator in such a state, the environment inside the vehicle will be impaired and the driver may experience allergic symptoms. Furthermore, ventilation resistance increases due to dew condensation in the evaporator.

Therefore, Patent Literature 3 proposes disposing a dehumidifier-filling box (dehumidifying portion) filled with a dehumidifying agent in the air conditioning duct on an upstream side of the evaporator. Further, Patent Literature 4 proposes that a desiccant type dehumidifier (dehumidifying portion) be disposed in the air conditioning duct on an upstream side of the evaporator. Furthermore, Patent Literature 5 proposes disposing a moisture absorption unit (dehumidifying portion) including a moisture absorption member in the air conditioning duct on an upstream side of the evaporator. According to these techniques, an amount of moisture in the air flowing into the evaporator can be reduced in advance, thereby suppressing dew condensation in the evaporator. Furthermore, the dehumidifying portion that has absorbed the moisture can be regenerated by heating it with a heater or the like.

However, since the dehumidifier-filling box of Patent Literature 3 is filled with the dehumidifier, it has an increased resistance (ventilation resistance) when the air flows through the inside of the dehumidifier-filling box. Therefore, it is necessary to increase the output of the ventilator (fan) installed in the air conditioning duct, which will increase power consumption.

The desiccant type dehumidifying device of Patent Literature 4 requires a separate heater to be provided in order to regenerate the dehumidifying member, resulting in an increase in the size of the device. Furthermore, since the dehumidifying member cannot be directly heated, the heating (regeneration) efficiency of the dehumidifying member cannot be sufficient.

The moisture absorption unit of Patent Literature 5 has the same problem as that of Patent Literature 4 because the moisture absorption member is made of a desiccant rotor.

The present invention was made to solve the problems as described above. An object of the present invention is to provide a vehicle air conditioning system that can increase a heating efficiency during regeneration while reducing power consumption, and can reduce the size of the system.

PRIOR ART

Patent Literatures

[Patent Literature 1] Japanese Patent Application Publication No. 2017-528316 A

[Patent Literature 2] Japanese Patent Application Publication No. 2020-104774 A

[Patent Literature 3] Japanese Patent Application Publication No. 2004-291863 A

[Patent Literature 4] Japanese Patent Application Publication No. 2017-43309 A

[Patent Literature 5] Japanese Patent Application Publication No. 2020-196406 A

SUMMARY OF THE INVENTION

As a result of extensive studies for air conditioning systems for vehicles, the present inventors have found that the above problems can be solved by disposing a humidity control device including a predetermined honeycomb structure and a dehumidifying layer formed at a predetermined position of the honeycomb structure on an upstream of the evaporator in the air conditioning duct, and they have completed the present invention. That is, the present invention is illustrated as follows:

[1]

A vehicle air conditioning system, comprising:

an air conditioning duct through which air can flow;

an evaporator disposed in the air conditioning duct; and a humidity control device disposed on an upstream side of the evaporator in the air conditioning duct, wherein the humidity control device comprises: a honeycomb structure comprising an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property; and a dehumidifying layer formed on a surface of each of the partition walls.

[2]

The vehicle air conditioning system according to [1], wherein the air conditioning duct has a first path for allowing the air to flow into the evaporator and a second path for discharging the air to a vehicle exterior, between the evaporator and the humidity control device, and wherein the air conditioning system further comprises a switching valve capable of switching the flow of the air between the first path and the second path.

[3]

The vehicle air conditioning system according to [1] or [2], wherein the material having the PCT property has a Curie point of 80 to 200° C.

[4]

The vehicle air conditioning system according to any one of [1] to [3], wherein the humidity control device further comprises a pair of electrodes provided on the honeycomb structure.

[5]

The vehicle air conditioning system according to [4], wherein the humidity control device further comprises terminals connected to the pair of electrodes.

[6]

The vehicle air conditioning system according to any one of [1] to [5], wherein the material having the PTC property is made of a material comprising barium titanate as a main component, the material being substantially free of lead.

[7]

The vehicle air conditioning system according to any one of [1] to [6], wherein the material having the PTC property has a volume resistivity of 0.5 to 300 Ω·cm at 25° C.

[8]

The vehicle air conditioning system according to any one of [1] to [7], wherein the honeycomb structure has a thickness of the partition wall of 0.30 mm or less, a cell density of 100 cells/cm² or less, and a cell pitch of 1.0 mm or more.

[9]

The vehicle air conditioning system according to any one of [1] to [7], wherein the honeycomb structure has a thickness of the partition wall of 0.08 to 0.36 mm, a cell density of 2.54 to 140 cells/cm², and an opening ratio of the cells of 0.70 or more.

[10]

The vehicle air conditioning system according to any one of [1] to [9], wherein the dehumidifying layer comprises a dehumidifying material.

[11]

The vehicle air conditioning system according to any one of [1] to [10], wherein the dehumidifying layer comprises a functional material having a function of adsorbing carbon dioxide and/or volatile components.

[12]

The vehicle air conditioning system according to any one of [1] to [11], wherein the dehumidifying layer comprises a catalyst.

DETAILED DESCRIPTION OF THE INVENTION

The vehicle air conditioning system according to an embodiment of the present invention includes: an air conditioning duct through which air can flow; an evaporator disposed in the air conditioning duct; and a humidity control device disposed on upstream side of the evaporator in the air conditioning duct. Also, the humidity control device includes: a honeycomb structure including an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property; and a dehumidifying layer formed on a surface of each of the partition walls. Since the vehicle air conditioning system according to the embodiment of the present invention uses the humidity control device in which the dehumidifying layer is provided on a surface of each of the partition walls of the honeycomb structure, it is difficult to increase ventilation resistance when air flows through the humidity control device, so that power consumption can be suppressed. Further, in the vehicle air conditioning system according to the embodiment of the present invention, the honeycomb structure functions as a heater element that generates heat when a current is allowed to flow by applying a voltage, so that the dehumidifying layer can be directly heated by the heat of the honeycomb structure during a regeneration process of the dehumidifying layer. Therefore, it is possible to increase the heating efficiency during the regeneration process, and it is also possible to reduce the size of the system because there is no need to separately provide a heater or the like.

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

The vehicle air conditioning system according to an embodiment of the present invention can be suitably utilized as a vehicle air conditioning system in a vehicle. The vehicle includes, but not limited to, automobiles and trains. Non-limiting examples of the automobile include gasoline vehicles, diesel vehicles, gas fuel vehicles using CNG (a compressed natural gas) or LNG (a liquefied natural gas), fuel cell vehicles, plug-in hybrid vehicles and electric vehicles. Among them, the air conditioning system according to the embodiment of the present invention can be suitably used in electric vehicles for which reduction of power consumption is particularly required.

Figure 1:
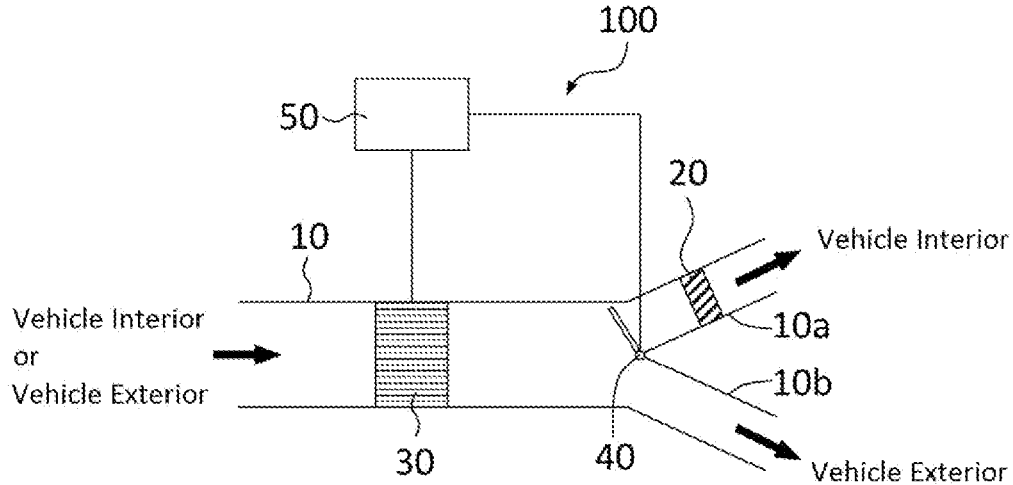
FIG. 1 is an overall schematic configuration view of a vehicle air conditioning system according to an embodiment of the present invention.
Figure 2A:
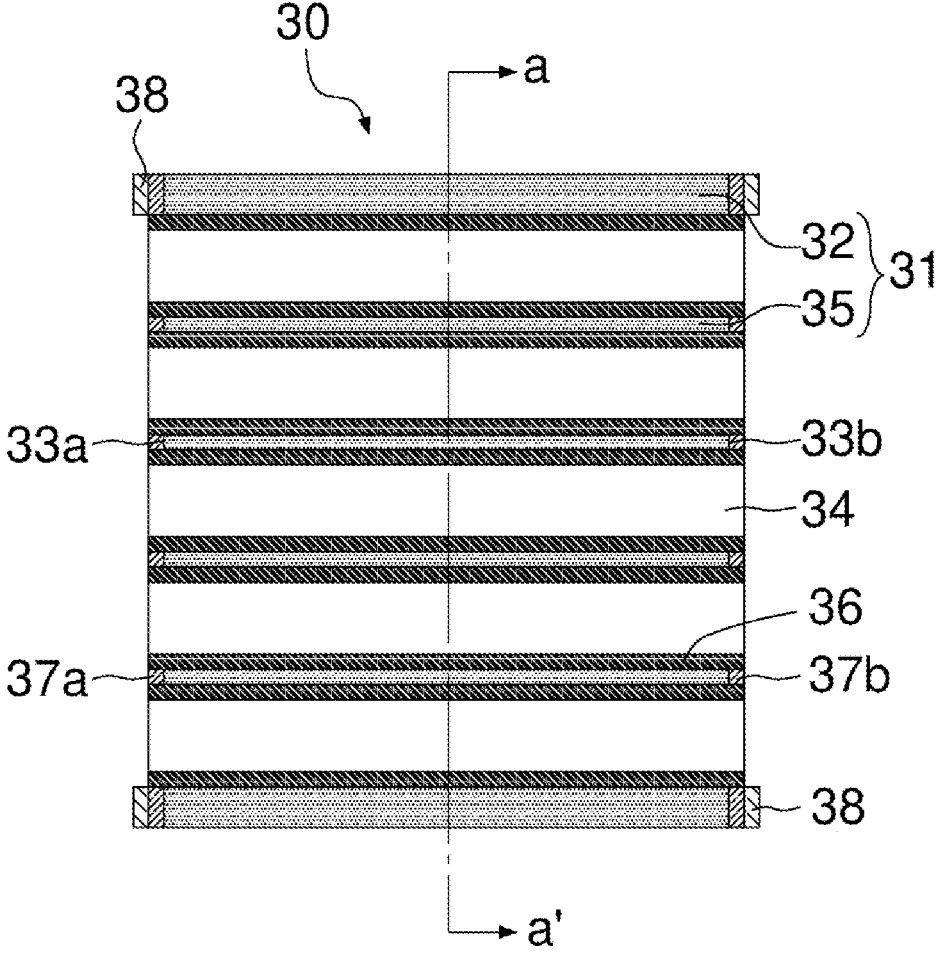
FIG. 2A is a schematic view of a cross section parallel to a flow path direction of a humidify control device used for a vehicle air conditioning system and a method for regenerating a humidify control device according to an embodiment of the present invention.
Figure 2B:
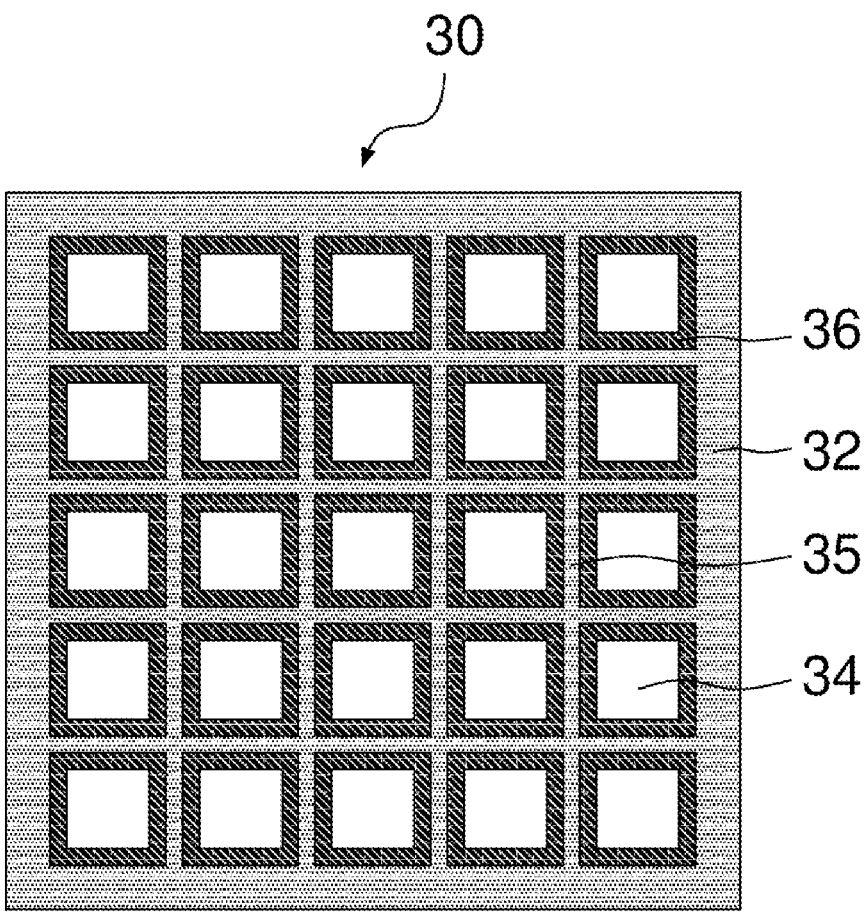
FIG. 2B is a schematic cross-sectional view of the humidity control device in FIG. 2A taken along the line a-a'.

FIG. 1 is an overall schematic configuration view of a vehicle air conditioning system according to an embodiment of the present invention. FIG. 2A is a schematic view of a cross section parallel to a flow path direction of a humidity control device used for a vehicle air conditioning system according to an embodiment of the present invention. FIG. 2B is a schematic cross-sectional view of the humidity control device in FIG. 2A taken along the line a-a'.

As shown in FIG. 1, a vehicle air conditioning system 100 according to an embodiment of the present invention includes: an air conditioning duct 10 through which air can flow; an evaporator 20 disposed in the air conditioning duct 10; and a humidity control device 30 disposed on an upstream side of the evaporator 20 in the air conditioning duct 10. The air conditioning duct 10 can have, on a downstream side of the humidity control device 30, a first path 10a that allows the air to flow into the vehicle interior, and a second path 10b that allows the air to be discharged to the vehicle exterior. The evaporator 20 can be disposed in the first path 10a.

The vehicle air conditioning system 100 can further include a switching valve 40 that can switch the flow of the air between the first path 10a and the second path 10b. Further, the vehicle air conditioning system 100 can further include a control unit 50 for controlling the humidity control device 30 and the switching valve 40.

As shown in FIGS. 2A and 2B, the humidity control device 30 includes: a honeycomb structure 31 having an outer peripheral wall 32 and partition walls 35 disposed on an inner side of the outer peripheral wall 32 and defining a plurality of cells 34, each extending from a first end face 33a to a second end face 33b to form a flow path, at least the partition walls 35 being made of a material having a PTC property; and a dehumidifying layer 36 formed on a surface of each of the partition walls 35. The humidify control device 30 can further include: a pair of electrodes 37a, 37b; and terminals 38 connected to the pair of electrodes 37a, 37b.

In the vehicle air conditioning system 100 having the above structure, air from the vehicle interior or vehicle exterior flows into the humidity control device 30 through the air conditioning duct 10, and moisture in the air is captured (removed) by the dehumidifying layer 36 while the air passes through the humidity control device 30. The air with reduced moisture content then flows into the evaporator 20 through the first path 10a. Since the moisture content of the air flowing into the evaporator 20 is reduced by the humidity control device 30, dew condensation in the evaporator 20 is suppressed. The air that has passed through the evaporator 20 returns to the vehicle interior.

Since the performance of the dehumidifying layer 36 gradually decreases as a captured amount of the moisture increases, the dehumidifying layer 36 should be regenerated. The dehumidifying layer 36 is regenerated by applying a voltage to the pair of electrodes 37a, 37b and heating the honeycomb structure 31. Since the dehumidifying layer 36 is directly heated by the heating of the honeycomb structure 31, the moisture captured in the dehumidifying layer 36 is effectively desorbed or reacted from the dehumidifying layer 36 and released, and is discharged to the vehicle exterior through the second path 10b.

Each component of the vehicle air conditioning system 100 will be described below in detail.

(1. Air Conditioning Duct 10)

The air conditioning duct 10 is a flow path through which air can flow. The upstream side of the air conditioning duct 10 is connected to the vehicle interior or an outside air introduction port. The air conditioning duct 10 allows the air from the vehicle interior or vehicle exterior to flow in, and also allows the air that has passed through the humidity control device 30 to flow in the vehicle interior or discharge it to the vehicle exterior. Therefore, it is preferable that the air conditioning duct 10 has, between the evaporator 20 and the humidity control device 30, a first path 10a that allows the air to flow in the evaporator 20 and a second path 10b that discharges the air to the vehicle exterior.

The air conditioning duct 10 may include a switching valve 40 that can switch the flow of the air between the first path 10a and the second path 10b. The switching valve 40 is not particularly limited as long as it is electrically driven and has the function of switching the flow path, and a solenoid valve, an electric valve, and the like can be used. For example, the switching valve 40 includes an opening/closing door supported by a rotating shaft and an actuator such as a motor that rotates the rotating shaft. The actuator can be configured to be controllable by the control unit.

Additionally, a ventilator (not shown) can be provided in the air conditioning duct 10 for causing the air from the vehicle interior to flow in the humidity control device 30. Although the position of the ventilator is not particularly limited, it can be provided on an upstream side of the humidity control device 30, for example.

(2. Evaporator 20)

The evaporator 20 is a device for dehumidifying and cooling the air. The evaporator 20 is not particularly limited, and any known evaporator can be used. The evaporator 20 is made of, for example, a flat tube with fins, and is connected to a compressor, a condenser, or the like to form a refrigeration cycle.

(3. Humidity Control Device 30)

As shown in FIGS. 2A and 2B, the humidity control device 30 includes: a honeycomb structure 31 having an outer peripheral wall 32 and partition walls 35 disposed on an inner side of the outer peripheral wall 32, the partition walls 35 defining a plurality of cells 34 each extending from a first end face 33a to a second end face 33b to form a flow path; and a dehumidifying layer 36 formed on a surface of each of the partition wall 35a. The humidity control device 30 can further include a pair of electrodes 37a, 37b provided on the honeycomb structure 31. Also, the humidity control device 30 may further include terminals 38 connected to the pair of electrodes 37a, 37b.

(3-1. Honeycomb Structure 31)

The shape of the honeycomb structure 31 is not particularly limited. For example, an outer shape of a cross section of the honeycomb structure 31 orthogonal to the flow path direction (the extending direction of the cells 34) can be polygonal such as quadrangular (rectangular, square), pentagonal, hexagonal, heptagonal, and octagonal, circular, oval (egg-shaped, elliptical, elliptic, rounded rectangular, etc.), or the like. The end faces (first end face 33a and second end face 33b) have the same shape as the cross section. Also, when the cross section and the end faces are polygonal, the corners may be chamfered.

The shape of each cell 34 is not particularly limited, but it may be polygonal such as quadrangular, pentagonal, hexagonal, heptagonal, and octagonal, circular, or oval in the cross section of the honeycomb structure 31 orthogonal to the flow path direction. These shapes may be alone or in combination of two or more. Moreover, among these shapes, the quadrangle or the hexagon is preferable. By providing the cells 34 having such a shape, it is possible to reduce the pressure loss when the air flows.

The honeycomb structure 31 may be a honeycomb joined body having a plurality of honeycomb segments and joining layers that join outer peripheral side surfaces of the plurality of honeycomb segments together. The use of the honeycomb joined body can increase the total cross-sectional area of the cells 34, which is important for ensuring the flow rate of air, while suppressing cracking.

It should be noted that the joining layer can be formed by using a joining material. The joining material is not particularly limited, but a ceramic material obtained by adding a solvent such as water to form a paste can be used. The joining material may contain a material having the PTC property, or may contain the same material as the outer peripheral wall 32 and the partition walls 35. In addition to the role of joining the honeycomb segments to each other, the joining material can also be used as an outer peripheral coating material after joining the honeycomb segments.

From the viewpoints of ensuring the strength of the honeycomb structure 31, reducing pressure loss when air passes through the cells 34, ensuring the amount of functional material supported, and ensuring the contact area with the air flowing inside the cells 34, it is desirable to suitably combine a thickness of the partition wall 35, a cell density, and a cell pitch (or an opening ratio of the cells 34).

As used herein, the cell density refers a value obtained by dividing a number of cells by an area of one end face (first end face 33*a* or second end face 33*b*) of the honeycomb structure 31 (the total area of the partition walls 35 and the cells 34 excluding the outer peripheral wall 32).

As used herein, the cell pitch refers to a value obtained by the following calculation. First, the area of one end face (first end face 33*a* or second end face 33*b*) of the honeycomb structure 31 (the total area of the partition walls 35 and the cells 34 excluding the outer peripheral wall 32) is divided by the number of the cells to calculate an area per a cell. A square root of the area per a cell is then calculated, and this is determined to be the cell pitch.

As used herein, the opening ratio of the cells 34 refers a value obtained by dividing the total area of the cells 34 defined by the partition walls 35 by the area of one end face (first end face 33*a* or second end face 33*b*) (the total area of the partition walls 35 and the cells 34 excluding the outer peripheral wall 32) in the cross section orthogonal to the flow path direction of the honeycomb structure 31. It should be noted that when calculating the opening ratio of the cells 34, the pair of electrodes 37*a*, 37*b*, and the dehumidifying layer 36 are not taken into account.

In an embodiment that is advantageous from the viewpoint of supporting a sufficient amount of functional material, the thickness of the partition wall 35 is 0.30 mm or less, the cell density is 100 cells/cm$^2$ or less, and the cell pitch is 1.0 mm or more. In a preferred embodiment, the thickness of the partition wall 35 is 0.20 mm or less, the cell density is 70 cells/cm$^2$ or less, and the cell pitch is 1.2 mm or more. In a more preferred embodiment, the thickness of the partition wall 35 is 0.13 mm or less, the cell density is 65 cells/cm$^2$ or less, and the cell pitch is 1.3 mm or more.

From the viewpoints of ensuring the strength of the honeycomb structure 31 and maintaining lower electrical resistance, the lower limit of the thickness of the partition wall 35 is preferably 0.010 mm or more, and more preferably 0.020 mm or more, and even more preferably 0.030 mm or more.

From the viewpoints of ensuring the strength of the honeycomb structure 31, maintaining lower electrical resistance, and increasing a surface area to facilitate reaction, adsorption, and release, the lower limit of the cell density is 30 cells/cm$^2$ or more, and preferably 35 cells/cm$^2$ or more, and even more preferably 40 cells/cm$^2$ or more.

From the viewpoints of ensuring the strength of the honeycomb structure 31, maintaining lower electrical resistance and increasing a surface area to facilitate reaction, adsorption and release, the upper limit of the cell pitch is 2.0 mm or less, and more preferably 1.8 mm or less, and even more preferably 1.6 mm or less.

In an embodiment that is advantageous in terms of both reducing pressure loss and maintaining strength, the thickness of the partition wall 35 is 0.08 to 0.36 mm, the cell density is 2.54 to 140 cells/cm$^2$, and the opening ratio of the cells 34 is 0.70 or more. In a preferred embodiment, the thickness of the partition wall 35 is 0.09 to 0.35 mm, the cell density is 15 to 100 cells/cm$^2$, and the opening ratio of the cells 34 is 0.80 or more. In a more preferred embodiment, the thickness of the partition wall 35 is 0.14 to 0.30 mm, the cell density is 20 to 90 cells/cm$^2$, and the opening ratio of the cells 34 is 0.85 or more.

From the viewpoint of ensuring the strength of the honeycomb structure 31, the upper limit of the opening ratio of the cells 34 is preferably 0.94 or less, and more preferably 0.92 or less, and even more preferably 0.90 or less.

Although the thickness of the outer peripheral wall 32 is not particularly limited, it is preferably determined based on the following viewpoints. First, from the viewpoint of reinforcing the honeycomb structure 31, the thickness of the outer peripheral wall 32 is preferably 0.05 mm or more, and more preferably 0.06 mm or more, and even more preferably 0.08 mm or more. On the other hand, the thickness of the outer peripheral wall 32 is preferably 1.0 mm or less, and more preferably 0.5 mm, and more preferably 0.4 mm or less, and still more preferably 0.3 mm or less, from the viewpoint of suppressing the initial current by increasing the electrical resistance and from the viewpoint of reducing pressure loss when air flows.

As used herein, the thickness of the outer peripheral wall 32 refers to a length from a boundary between the outer peripheral wall 32 and the outermost cell 34 or the partition wall 35 to a side surface of the honeycomb structure 31 in a normal line direction of the side surface in the cross section orthogonal to the flow path direction.

The length of the honeycomb structure 31 in the flow path direction and the cross-sectional area orthogonal to the flow path direction may be adjusted according to the required size of the humidity control device 30, and are not particularly limited. For example, when used in a compact humidity control device 30 while ensuring a predetermined function, the honeycomb structure 31 can have a length of 2 to 20 mm in the flow path direction and a cross-sectional area of 10 cm$^2$ or more orthogonal to the flow path direction. Although the upper limit of the cross-sectional area orthogonal to the flow path direction is not particularly limited, it is, for example, 300 cm$^2$ or less The partition walls 35 forming the honeycomb structure 31 are made of a material that can be heated by electric conduction, specifically made of a material having the PTC (Positive Temperature Coefficient) property. Further, the outer peripheral wall 32 may also be made of the material having the PTC property, as with the partition walls 35, as needed. By such a configuration, the dehumidifying layer 36 can be directly heated by heat transfer from the heat-generating partition walls 35 (and optionally the outer peripheral wall 32). Further, the material having the PTC property has characteristics such that when the temperature increases to exceed the Curie point, the resistance value is sharply increased, resulting in a difficult for electricity to flow. Therefore, when the temperature of the partition walls 35 (and the outer peripheral wall 32 if necessary) becomes high, the current flowing through them is limited, thereby suppressing excessive heat generation of the honeycomb structure 31. Therefore, it is possible to suppress thermal deterioration of the dehumidifying layer 36 due to excessive heat generation.

The lower limit of the volume resistivity at 25° C. of the material having the PTC property is preferably 0.5 Ω·cm or more, and more preferably 1 Ω·cm or more, and even more preferably 5 Ω·cm or more, from the viewpoint of obtaining appropriate heat generation. The upper limit of the volume resistivity at 25° C. of the material having the PTC property is preferably 30 Ω·cm or less, and more preferably 18 Ω·cm or less, and even more preferably 16 Ω·cm or less, from the viewpoint of generating heat with a low driving voltage. As used herein, the volume resistivity at 25° C. of the material having the PTC property is measured according to JIS K 6271:2008.

From the viewpoints that can be heated by electric conduction and has the PTC property, the outer peripheral wall 32 and the partition walls 35 are preferably made of a material containing barium titanate (BaTiO₃) as a main component. Also, this material is more preferably ceramics made of a material containing barium titanate (BaTiO₃)-based crystals as a main component in which a part of Ba is substituted with a rare earth element. As used herein, the term "main component" means a component in which a proportion of the component is more than 50% by mass of the total component. The content of BaTiO₃-based crystalline particles can be determined by fluorescent X-ray analysis. Other crystalline particles can also be measured by the same method.

The compositional formula of BaTiO₃-based crystalline particles, in which a part of Ba is substituted with the rare earth element, can be expressed as $(Ba_{1-x}A_x)TiO_3$. In the compositional formula, the symbol A represents at least one rare earth element, and $0.001 \leq x \leq 0.010$.

The symbol A is not particularly limited as long as it is the rare earth element, but it may preferably be one or more selected from the group consisting of La, Ce, Pr, Nd, Eu, Gd, Dy, Ho, Er, Y and Yb, and more preferably La. The x value is preferably 0.001 or more, and more preferably 0.0015 or more, in terms of suppressing excessively high electrical resistance at room temperature. On the other hand, x is preferably 0.009 or less, in terms of preventing the electrical resistance at room temperature from becoming too high due to insufficient sintering.

The content of the BaTiO₃-based crystalline particles in which a part of Ba is substituted with the rare earth element in the ceramics is not particularly limited as long as it is determined to be the main component, but it may preferably be 90% by mass or more, and more preferably 92% by mass or more, and even more preferably 94% by mass or more. The upper limit of the content of the BaTiO₃-based crystalline particles is not particularly limited, but it may generally be 99% by mass, and preferably 98% by mass.

The content of the BaTiO₃-based crystalline particles can be measured by fluorescent X-ray analysis. Other crystalline particles can be measured in the same manner as this method.

In terms of reduction of the environmental load, it is desirable that the materials used for the outer peripheral wall 32 and the partition walls 35 are substantially free of lead (Pb). More particularly, the outer peripheral wall 32 and the partition walls 35 preferably have a Pb content of 0.01% by mass or less, and more preferably 0.001% by mass or less, and still more preferably 0% by mass. The lower Pb content can allow the air heated by contact with the heat-generating partition walls 35 to be safely applied to organisms such as humans, for example. In the outer peripheral wall 32 and the partition walls 35, the Pb content is preferably less than 0.03% by mass, and more preferably less than 0.01% by mass, and further preferably 0% by mass, as converted to PbO. The lead content can be determined by ICP-MS (inductively coupled plasma mass spectrometry).

The Curie point of the material making up the outer peripheral wall 32 and the partition walls 35 is preferably in a temperature range where the resistance value is twice or more the resistance at room temperature (25° C.). If the Curie point is in such a temperature range, the current flowing through the humidity control device 30 will be limited when the temperature of the humidity control device 30 becomes high, so that any excessive heat generation of the humidity control device 30 will be efficiently suppressed. Therefore, thermal deterioration of the dehumidifying layer 36 due to excessive heat generation can be suppressed.

The material making up the outer peripheral wall 32 and the partition walls 35 preferably have a lower limit of a Curie point of 80° C. or more, and more preferably 100° C. or more, and even more preferably 110° C. or more, and still more preferably 125° C. or more, in terms of efficiently heating the dehumidifying layer 36. Further, the upper limit of the Curie point is preferably 200° C. or more, and preferably 190° C. or more, and even more preferably 180° C. or more, and particularly preferably 150° C. or more, in terms of safety as a component placed in the vehicle interior or near the vehicle interior.

The Curie point of the material making up the outer peripheral wall 32 and the partition walls 35 can be adjusted by the type of shifter and an amount of the shifter added. For example, the Curie point of barium titanate (BaTIO₃) is about 120° C., but the Curie point can be shifted to the lower temperature side by substituting a part of Ba and Ti with one or more of Sr, Sn and Zr.

As used herein, the Curie point is measured by the following method. A sample is attached to a sample holder for measurement, mounted in a measuring tank (e.g., MINI-SUBZERO MC-810P, from ESPEC), and a change in electrical resistance of the sample as a function of a temperature change when the temperature is increased from 10° C. is measured using a DC resistance meter (e.g., Multimeter 3478A, from YOKOGAWA HEWLETT PACKARD, LTD.). Based on an electrical resistance-temperature plot obtained by the measurement, a temperature at which the resistance value is twice the resistance value at room temperature (20° C.) is defined as the Curie point.

(3-2. Pair of Electrodes 37a, 37b)

A pair of electrodes 37a, 37b may be provided on the first end face 33a and the second end face 33b as shown in FIG. 2A, although the positions of the electrodes 37a, 37b are not limited thereto. Also, the pair of electrodes 37a, 37b may be provided on a pair of outer peripheral walls 32 parallel to the extending direction of the cells 34.

Applying of a voltage between the pair of electrodes 37a, 37b allows the honeycomb structure 31 to generate heat by Joule heat.

The pair of electrodes 37a, 37b may employ, for example, a metal or alloy containing at least one selected from Cu, Ag, Al, Ni and Si, although not particularly limited thereto. It is also possible to use an ohmic electrode capable of ohmic contact with the outer peripheral wall 32 and/or the partition walls 35 which have the PTC property. The ohmic electrode may employ an ohmic electrode containing, for example, at least one selected from Al, Au, Ag and In as a base metal, and containing at least one selected from Ni, Si, Zn, Ge, Sn, Se and Te for n-type semiconductors as a dopant. Further, the pair of electrodes 37a, 37b may have a single-layer structure, or may have a laminated structure of two or more layers. When the pair of electrodes 37a, 37b have the laminated structure of two or more layers, the materials of the respective layers may be of the same type or of different types.

The thickness of the pair of electrodes 37a, 37b may be appropriately set according to the method for forming the pair of electrodes 37a, 37b. The method for forming the pair of electrodes 37a, 37b includes metal deposition methods such as sputtering, vapor deposition, electrolytic deposition, and chemical deposition. Alternatively, the pair of electrodes 37a, 37b can be formed by applying an electrode paste and then baking it, or by thermal spraying. Furthermore, the pair of electrodes 37a, 37b may be formed by joining metal sheets or alloy sheets.

Each of the thicknesses of the pair of electrodes 37a, 37b is, for example, about 5 to 80 μm for baking the electrode paste, and about 100 to 1000 nm for dry plating such as sputtering and vapor deposition, and about 10 to 100 μm for thermal spraying, and about 5 μm to 30 μm for wet plating such as electrolytic deposition and chemical deposition. Further, when joining the metal sheet or alloy sheet, each of the thicknesses is preferably about 5 to 100 μm.

(3-3. Terminal 38)

The terminals 38 are connected to the pair of electrodes 37a, 37b, and provided on at least part of the pair of electrodes 37a, 37b. The provision of the terminals 38 facilitates connection to an external power supply. The terminals 38 are connected to a conductor connected to the external power supply.

The terminals 38 may be made of any material, including, but not particularly limited to, a metal, for example. The metal that can be used herein may include single metals, alloys, and the like, but from the viewpoint of corrosion resistance, electrical resistivity, and coefficient of linear expansion, it may preferably be alloys containing at least one selected from the group consisting of Cr, Fe, Co, Ni, Cu, Al, and Ti, and more preferably stainless steel, Fe—Ni alloy, and phosphor bronze.

The size and shape of the terminal 38 are not particularly limited. For example, as shown in FIG. 2A, the terminals 38 can be provided on the whole of the pair of electrodes 37a, 37b on the outer peripheral wall 32. Further, the terminals 38 may be provided on a part of the pair of electrodes 37a, 37b on the outer peripheral wall 32, or may be provided so as to extend toward an outer side than the outer edge of each of the pair of electrodes 37a, 37b on the outer peripheral wall 32. Further, the terminals 38 may be provided on a part of the pair of electrodes 37a, 37b on the partition walls 35, or may be provided so as to block a part of the cells 34.

Furthermore, the thickness of the terminal 38 is not particularly limited, but it is, for example, 0.01 to 10 mm, typically 0.05 to 5 mm.

The method of connecting the terminals 38 to the pair of electrodes 37a, 37b is not particularly limited as long as they are electrically connected. For example, they can be connected by diffusion bonding, a mechanical pressing mechanism, welding, or the like.

In the humidity control device 30, the volume resistivity [cm] of the pair of electrodes 37a, 37b is ρ1, the thickness [mm] of the pair of electrodes 37a, 37b is t1, the volume resistivity [Ω cm] of the partition walls 35 is ρ2, the thickness [mm] of the partition wall 35 is t2, the volume resistivity [Ω·cm] of the terminals 38 is ρ3, and the thickness [mm] of the terminal 38 is t3.

In this case, in the humidity control device 30, $(\rho1/t1)/(\rho2/t2)$ is 0.003 or less. By controlling the value of $(\rho1/t1)/(\rho2/t2)$ in such a range, the electrical resistance of the pair of electrodes 37a, 37b is sufficiently lower than that of the base material (partition walls 35) of the honeycomb structure 31. As a result, the current from the pair of electrodes 37a, 37b tends to spread uniformly to the partition walls 35, so that the deviation of the current can be suppressed and the temperature distribution in the humidity control device 30 can be made uniform. From the viewpoint of stably ensuring this effect, the $(\rho1/t1)/(\rho2/t2)$ is preferably 0.001 or less, and more preferably 0.0001 or less. Although the lower limit is not particularly limited because a lower value of $(\rho1/t1)/(\rho2/t2)$ tends to obtain the above effect, it is, for example, 0.0000001.

Further, in the humidity control device 30, the $(\rho1/t1)/(\rho3/t3)$ is 0.02 or more. By controlling the value of $(\rho1/t1)/(\rho3/t3)$ in such a range, the current from the terminals 38 tends to spread uniformly to the pair of electrodes 37a, 37b. As a result, the current also tends to spread uniformly from the pair of electrodes 37a, 37b to the partition walls 35, so that the deviation of the current can be suppressed and the temperature distribution in the humidity control device 30 can be made uniform. It should be noted that if the $(\rho1/t1)/(\rho3/t3)$ is less than 0.02, the current will flow through a part of the pair of electrodes 37a, 37b before spreading the current in the terminals, resulting in the deviation of the current. From the viewpoint of stably ensuring the above effects, the $(\rho1/t1)/(\rho3/t3)$ is preferably 1 or more, and more preferably 10 or more. Although the upper limit is not particularly limited because a larger value of $(\rho1/t1)/(\rho3/t3)$ tends to obtain the above effect, it is, for example, 5000.

As used herein, the thickness of the pair of electrodes 37a, 37b refers to an average value of the thicknesses of all the electrodes 37a, 37b. Further, the thickness of the partition wall 35 refers to a length of a line segment across the partition wall 35 when the centers of gravity of adjacent cells 34 are connected by the line segment in a cross section orthogonal to the flow path direction. The thickness of the partition wall 35 refers to an average value of the thicknesses of all the partition walls 35. Furthermore, the thickness of the terminal 38 refers to an average value of the thicknesses of all the terminals 38.

The thicknesses of the pair of electrodes 37a, 37b and the terminal 38 can be measured in the cross section parallel to the flow path direction. Alternatively, the thicknesses of the materials used for the pair of electrodes 37a, 37b and the terminals 38 may be the thicknesses of the pair of electrodes 37a, 37b and the terminal 38. Also, the thickness of the partition wall 35 can be measured in the cross section orthogonal to the flow path direction.

The volume resistivity of each of the pair of electrodes 37a, 37b, the partition walls 35, and the terminals 38 refers to a volume resistivity at 25° C. The volume resistivity at 25° C. is measured according to JIS K 6271:2008.

In the humidity control device 30, the area [mm$^2$] of the surfaces where the terminals 38 are in contact with the pair of electrodes 37a, 37b is S1, and the area [mm$^2$] of the first end face 33a or second end face 33b of the honeycomb structure 31 is S2.

In this case, it is preferable that the humidity control device 30 has S1/S2 of 0.010 or more. By controlling the value of S1/S2 in such a range, it is possible to increase the area of the region where the current flows from the terminals 38 to the honeycomb structure 31 (electric conduction area), thereby suppressing the deviation of the current and easily making the temperature distribution in the humidity control device 30 uniform. From the viewpoint of stably ensuring this effect, the S1/S2 is more preferably 0.050 or more, and even more preferably 0.150 or more. On the other hand, a lager S1/S2 results in a smaller area of the region (cells 34) through which the air flows. Therefore, the S1/S2 is preferably 0.430 or less, and more preferably 0.300 or less, and even more preferably 0.250 or less.

As used herein, the area of the first end face 33*a* or the second end face 33*b* of the honeycomb structure 31 refers to an area of the first end face 33*a* or the second end face 33*b* composed of the outer peripheral wall 32, the cells 34, and the partition walls 35.

Optionally, the humidity control device 30 may further include an intermediate member between the pair of electrodes 37*a*, 37*b* and the terminals 38.

In the humidity control device 30, the area [$mm^2$] of the surfaces where the terminals 38 are in contact with the intermediate material is S3, and the area [$mm^2$] of the surface where the intermediate material is in contact with the pair of electrodes 37*a*, 37*b* is S4.

In this case, the humidity control device 30 preferably has S4/S3 of 0.50 to 2.00. By controlling the value of S4/S3 in such a range, it is possible to smooth the flow of current between the pair of electrodes 37*a*, 37*b* and the terminals 38, thereby suppressing the deviation of the current and easily making the temperature distribution in the humidity control device 30 uniform. Also, when the S4/S3 is larger than 2.00, the above effect (effect of suppressing the local heat generation due to the deviation of the power) can be obtained, while the flow of the air is obstructed by the intermediate material, so that the contact area of the dehumidifying layer 36 with the air decreases, making it difficult to obtain sufficient performance of the dehumidifying layer 36. Further, when the S4/S3 is less than 0.50, it is difficult to obtain the above effect (the effect of suppressing the local heat generation due to the deviation of the power). From the viewpoint of stably ensuring the above effects, the S4/S3 is more preferably 0.50 to 1.20, and still more preferably 0.80 to 1.20.

The intermediate material is a member for increasing a degree of structural freedom in the connection between the pair of electrodes 37*a*, 37*b* and the terminals 38.

The intermediate material may be made of non-limiting materials, and it may be the same as the material of the terminal 38 as described above. Moreover, the material of the intermediate material may be different from that of the terminal 38 as described above. In this case, the intermediate material can be made of a solder, a brazing material, a conductive adhesive, or the like.

The size and shape of the intermediate material are not particularly limited. For example, the intermediate material can be provided over the whole of the pair of electrodes 37*a*, 37*b* on the outer peripheral wall 32. Further, the intermediate material may be provided on a part of the pair of electrodes 37*a*, 37*b* on the outer peripheral wall 32, or may be provided so as to extend toward an outer side than the outer edge of each of the pair of electrodes 37*a*, 37*b* on the outer peripheral wall 32. Furthermore, the intermediate material may be provided on a part of the pair of electrodes 37*a*, 37*b* on the partition walls 35, or may be provided so as to block a part of the cells 34.

The thickness of the intermediate material is not particularly limited, and it may be approximately the same as the thickness of the terminal 38, for example.

The method of connecting the intermediate material to the terminals 38 and the pair of electrodes 37*a*, 37*b* is not particularly limited as long as they are electrically connected, and they may be connected by, for example, diffusion bonding, mechanical pressing mechanism, welding, or the like.

(3-4. Dehumidifying Layer 36)

The dehumidifying layer 36 is a layer having a function of adsorbing water vapor.

The dehumidifying layer 36 can be provided on a surface of each of the partition walls 35 (in the case of the outermost cells 34, the partition walls 35 that define the outermost cells 34 and the outer peripheral wall 32). By thus providing the dehumidifying layer 36, the dehumidifying layer 36 can be easily heated during regeneration, so that the desired function due to the dehumidifying layer 36 can be regenerated.

The dehumidifying layer 36 contains a dehumidifying material from the viewpoint of ensuring the dehumidifying function. The dehumidifying material preferably has a function that can adsorb the moisture at −20 to 40° C. and release it at an elevated temperature of 60° C. or more.

Examples of the dehumidifying material include, but not limited to, aluminosilicate, silica gel, silica, graphene oxide, polymer adsorbents, polystyrene sulfonic acid, and metal organic frameworks (MOFs). These may be used alone or in combination of two or more.

Examples of the aluminosilicate that can be preferably used herein include AFI type-, CHA type-, or BEA type-zeolite; porous clay minerals such as allophane and imogolite. Also, it is more preferable that the aluminosilicate is amorphous.

Examples of the silica gel that can be preferably used herein include type A silica gel.

Examples of the polymer adsorbent that can be preferably used herein include a polymer adsorbent having a polyacrylic acid polymer chain. For example, sodium polyacrylate or the like can be used as the polymer adsorbent.

The metal organic framework is a crystalline hybrid material containing metal ions and organic molecules (organic ligands). The metal ions are preferably hydrophilic metal ions (for example, aluminum ions).

The dehumidification layer 36 can contain a functional material having a function of adsorbing carbon dioxide and/or volatile components. By containing such a functional material, it is possible to obtain an affect of purifying the air in addition to the effect of dehumidifying the air.

The functional material preferably has a function that can adsorb carbon dioxide and/or volatile components at −20 to 40° C. and release them at an elevated temperature of 60° C. or more.

Examples of the functional material having such a function include zeolite, silica gel, activated carbon, alumina, silica, low-crystalline clay, amorphous aluminum silicate complexes, and the like. The type of the functional material may be appropriately selected depending on the types of the components to be removed. The functional material may be used alone, or in combination with two or more types.

In addition, the volatile components contained in the air in the vehicle interior include, for example, volatile organic compounds (VOCs), and odor components other than the VOCs Specific examples of the volatile components include ammonia, acetic acid, isovaleric acid, nonenal, formaldehyde, toluene, xylene, paradichlorobenzene, ethylbenzene, styrene, chlorpyrifos, di-n-butyl phthalate, tetradecane, and di-2-ethylhexyl phthalate, diazinon, acetaldehyde, 2-(1-methylpropyl)phenyl N-methylcarbamate, and the like.

The dehumidifying layer 36 can contain a catalyst. By containing the catalyst, it is possible to promote oxidation-reduction reaction and the like to purify carbon dioxide and/or volatile components. The catalyst having such a function includes metal catalysts such as Pt, Pd and Ag, and oxide catalysts such as $CeO_2$ and $ZrO_2$. The catalyst may be used alone or in combination of two or more types. The catalyst may also be used in combination with the dehumidifying material and/or the functional material as described above.

The thickness of the dehumidifying layer 36 may be determined according to the size of the cells 34, and is not particularly limited. For example, the thickness of the dehumidifying layer 36 is preferably 20 μm or more, and more preferably 25 μm or more, and even more preferably 30 μm or more, from the viewpoint of ensuring sufficient contact with air. On the other hand, the thickness of the dehumidifying layer 36 is preferably 400 μm or less, and more preferably 380 μm or less, and even more preferably 350 μm or less, from the viewpoint of suppressing separation of the dehumidifying layer 36 from the partition walls 35 and the outer peripheral wall 32.

The thickness of the dehumidifying layer 36 is measured using the following procedure. Any cross section parallel to the flow path direction of the honeycomb structure 31 is cut out, and a cross-sectional image at magnifications of about 50 is acquired using a scanning electron microscope or the like. Also, this cross section is made to pass through the center of gravity position in the cross section orthogonal to the flow path of the honeycomb structure 31. The thickness of each dehumidifying layer 36 visually recognized from the cross-sectional image is calculated by dividing the cross-sectional area by the length of the cells 34 in the flow path direction. This calculation is performed for all the dehumidifying layers 36 visually recognized from the cross-sectional image, and an average value thereof is determined to be the thickness of the dehumidifying layer 36.

From the viewpoint of exerting a desired function in the humidity control device 30, an amount of the dehumidifying layer 36 is preferably 50 to 500 g/L, and more preferably 100 to 400 g/L, and even more preferably 150 to 350 g/L, based on the volume of the honeycomb structure 31. It should be noted that the volume of the honeycomb structure 31 is a value determined by the external dimensions of the honeycomb structure 31.

(3-5. Method for Producing Humidity Control Device 30)

The method for producing the humidity control device 30 according to the embodiment of the present invention is not particularly limited, and it can be performed according to a known method. Hereinafter, the method for producing the humidity control device 30 according to an embodiment of the present invention will be illustratively described.

A method for producing the honeycomb structure 31 forming the humidity control device 30 includes a forming step and a firing step.

In the forming step, a green body containing a ceramic raw material including $BaCO_3$ powder, $TiO_2$ powder, and rare earth nitrate or hydroxide powder is formed to prepare a honeycomb formed body having a relative density of 60% or more.

The ceramic raw material can be obtained by dry-mixing the powders so as to have a desired composition.

The green body can be obtained by adding a dispersion medium, a binder, a plasticizer and a dispersant to the ceramic raw material and kneading them. The green body may optionally contain additives such as shifters, metal oxides, property improving agents, and conductor powder.

The blending amount of the components other than the ceramic raw material is not particularly limited as long as the relative density of the honeycomb formed body is 60% or more.

As used herein, the "relative density of the honeycomb formed body" means a ratio of the density of the honeycomb formed body to the true density of the entire ceramic raw material. More particularly, the relative density can be determined by the following equation:

relative density of honeycomb formed body
(%)=density of honeycomb formed body
(g/cm$^3$)/true density of entire ceramic raw material (g/cm$^3$)×100.

The density of the honeycomb formed body can be measured by the Archimedes method using pure water as a medium. Further, the true density of the entire ceramic raw material can be obtained by dividing the total mass of the respective raw materials (g) by the total volume of the actual volumes of the respective raw materials (cm$^3$).

Examples of the dispersion medium include water or a mixed solvent of water and an organic solvent such as alcohol, and more preferably water.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose in combination with hydroxypropoxyl cellulose. The binder may be used alone, or in combination of two or more, but it is preferable that the binder does not contain an alkali metal element.

Examples of the plasticizer include polyoxyalkylene alkyl ethers, polycarboxylic acid-based polymers, and alkyl phosphate esters.

The dispersant that can be used herein includes surfactants such as polyoxyalkylene alkyl ether, ethylene glycol, dextrin, fatty acid soaps, and polyalcohol. The dispersant may be used alone or in combination of two or more.

The honeycomb formed body can be produced by extrude the green body. In the extrusion, a die having a desired overall shape, cell shape, partition wall thickness, cell density and the like can be used.

The relative density of the honeycomb formed body obtained by extrusion is 60% or more, and preferably 65% or more. By controlling the relative density of the honeycomb formed body to such a range, the honeycomb formed body can be densified and the electrical resistance at room temperature can be reduced. The upper limit of the relative density of the honeycomb formed body is not particularly limited, but it may generally be 80%, and preferably 75%.

The honeycomb formed body can be dried before the firing step. Non-limiting examples of the drying method include conventionally known drying methods such as hot air drying, microwave drying, dielectric drying, drying under reduced pressure, drying in vacuum, and freeze drying. Among these, a drying method that combines the hot air drying with the microwave drying or dielectric drying is preferable in that the entire formed body can be rapidly and uniformly dried.

The firing step includes maintaining the formed body at a temperature of from 1150 to 1250° C., and then increasing the temperature to a maximum temperature of from 1360 to 1430° C. at a heating rate of 20 to 600° C./hour, and maintaining the temperature for 0.5 to 10 hours.

The maintaining of the honeycomb formed body at the maximum temperature of from 1360 to 1430° C. for 0.5 to 10 hours can provide the honeycomb structure 31 containing, as a main component, $BaTiO_3$-based crystal particles in which a part of Ba is substituted with the rare earth element.

Further, the maintaining at the temperature of from 1150 to 1250° C. can allow the $Ba_2TiO_4$ crystal particles generated in the firing process to be easily removed, so that the honeycomb structure 31 can be densified.

Further, the heating rate of 20 to 600° C./hour from the temperature of 1150 to 1250° C. to the maximum temperature of 1360 to 1430° C. can allow 1.0 to 10.0% by mass of $Ba_6Ti_{17}O_{40}$ crystal particles to be formed in the honeycomb structure 31.

The maintaining time at 1150 to 1250° C. is not particularly limited, but it may preferably be from 0.5 to 10 hours. Such a maintaining time can lead to stable and easy removal of $Ba_2TiO_4$ crystal particles generated in the firing process.

The firing step preferably includes maintaining at 900 to 950° C. for 0.5 to 5 hours during the increasing of the temperature. The maintaining at 900 to 950° C. for 0.5 to 5 hours can lead to sufficient decomposition of $BaCO_3$, so that the honeycomb structure 31 having a predetermined composition can be easily obtained.

Prior to the firing step, a degreasing step for removing the binder may be performed. The degreasing step may preferably be performed in an air atmosphere in order to decompose the organic components completely.

Also, the atmosphere of the firing step may preferably be the air atmosphere in terms of control of electrical characteristics and production cost.

A firing furnace used in the firing step and the degreasing step is not particularly limited, but it may be an electric furnace, a gas furnace, or the like.

The pair of electrodes 37a, 37b is formed on the honeycomb structure 31 thus obtained. The pair of electrodes 37a, 37b can be formed by metal deposition methods such as sputtering, vapor deposition, electrolytic deposition, and chemical deposition. Further, the pair of electrodes 37a, 37b can also be formed by applying an electrode paste and then baking it. Furthermore, the pair of electrodes 37a, 37b can also be formed by thermal spraying. The pair of electrodes 37a, 37b may be composed of a single layer, but may also be composed of a plurality of electrode layers having different compositions. A typical method for forming the pair of electrodes 37a, 37b will be described below.

First, an electrode slurry containing an electrode material, an organic binder, and a dispersion medium is prepared, and the first end face 33a or the second end face 33b of the honeycomb structure 31 is coated with the slurry. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. An excess slurry on the periphery of the honeycomb structure 31 is removed by blowing and wiping. The slurry can be then dried to form the pair of electrodes 37a, 37b on the first end face 33a or the second end face 33b of the honeycomb structure 31. The drying can be performed while heating the heater element to a temperature of about 120 to 600° C., for example. Although a series of steps of coating, slurry removal, and drying may be performed only once, the steps can be repeated multiple times to provide the pair of electrodes 37a, 37b having desired thicknesses.

The terminals 38 are then disposed at predetermined positions of the pair of electrodes 37a, 37b, and the pair of electrodes 37a, 37b and the terminals 38 are connected to each other. As a method of connecting the pair of electrodes 37a, 37b to the terminals 38, the method described above can be used.

It should be noted that the terminals 38 may be disposed after forming a dehumidifying layer 36 described below.

The dehumidifying layer 36 is then formed on the surface of each of the partition walls 35 and the like of the honeycomb structure 31.

Although the method for forming the dehumidifying layer 36 is not particularly limited, it can be formed, for example, by the following steps. The honeycomb structure 31 is immersed in a slurry containing a functional material, an organic binder, and a dispersion medium for a predetermined period of time, and an excess slurry on the end faces and the outer periphery of the honeycomb structure 31 is removed by blowing and wiping. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. The slurry can be then dried to form the dehumidifying layer 36 on the surfaces of the partition walls 35. The drying can be performed while heating the honeycomb structure 31 to a temperature of about 120 to 600° C., for example. Although a series of steps of immersion, slurry removal, and drying may be performed only once, the steps can be repeated multiple times to provide the dehumidifying layer 36 having the desired thickness on the surface of each of the partition walls 35 and the like.

(4. Control Unit 50)

The control unit 50 is a portion for controlling the humidity control device 30 and the switching valve 40, and is electrically connected to the humidity control device 30 and the switching valve 40. The control unit 50 can adjust the heating state of the honeycomb structure 31 by controlling a power source (not shown) such as a battery for applying voltage to the pair of electrodes 37a, 37b of the humidity control device 30.

Further, the control unit 50 can also control the switching valve 40 so that the air flows through the first path 10a or the second path 10b. Further, the control unit 50 can also be electrically connected to a ventilator (not shown) to control the ventilator.

The control unit 50 is generally an ECU (Engine (electronic) Control Unit), although not particularly limited thereto. The ECU is a CPU for executing various calculation processes, a ROM for storing programs and data required for its control, a RAM for temporarily storing results of calculations performed by the CPU, and input/output ports for inputting and outputting signals to and from the outside.

In the dehumidifying mode, the control unit 50 switches the switching valve 40 so that air flows through the first path 10a, and starts the ventilator. Such a control allows the air in the vehicle interior to be dehumidified. At this time, the humidity control device 30 is not heated. Specifically, the air from the vehicle interior flows in the humidity control device 30 through the air conditioning duct 10, and the moisture contained in the air in the vehicle interior is captured by the dehumidifying layer 36 while the air passes through the humidity control device 30. The dehumidified air flowing out from the humidity control device 30 is passed through the evaporator 20 via the first path 10a and returned to the vehicle interior.

In the mode of regenerating the dehumidifying layer 36, the control unit 50 switches the switching valve 40 so that the air flows through the second path 10b, applies voltage to the pair of electrodes 37a, 37b, and activates the ventilator. Such a control allows the dehumidifying layer 36 to be regenerated. Specifically, the air from the vehicle interior allows the moisture captured in the dehumidifying layer 36 to be released while the air flows in the humidity control device 30 through the air conditioning duct 10 and passes through the humidity control device 30. Then, the air containing the moisture that has flowed out from the humidity control device 30 is discharged to the vehicle exterior through the second path 10b.

In the mode of regenerating the dehumidifying layer 36, the dehumidifying layer 36 is preferably heated at a temperature higher than the desorbing temperature depending on the type of the dehumidifying layer 36 in order to promote the desorbing of the moisture captured by the dehumidifying layer 36. For example, it is more preferable to heat the dehumidifying layer 36 at 70 to 150° C., even more preferably 80 to 140° C., and still more preferably 90 to 130° C.

From the viewpoint of stably performing the above control, it is desirable that the humidity control device 30 be placed at a position close to the vehicle interior. Therefore, from the viewpoint of preventing electric shock and the like, it is preferable that the driving voltage of the humidity control device 30 is 60V or less. Since the honeycomb structure 31 used in the humidity control device 30 has a low electrical resistance at room temperature, the honeycomb structure 31 can be heated at the low driving voltage. It should be noted that the lower limit of the driving voltage is not particularly limited, but it may preferably be 10 V or more. If the driving voltage is less than 10V, the current during heating the honeycomb structure 31 becomes large, so that the conductor wire should be thick.

DESCRIPTION OF REFERENCE NUMERALS

10 air conditioning duct
10a first path
10b second path
20 evaporator
30 humidity control device
31 honeycomb structure
32 outer peripheral wall
33a first end face
33b second end face
34 cell
35 partition wall
36 dehumidifying layer
37a, 37b pair of electrodes
38 terminal
40 switching valve
50 control unit
100 vehicle air conditioning system

The invention claimed is:

1. A vehicle air conditioning system, comprising:
an air conditioning duct through which air can flow;
an evaporator disposed in the air conditioning duct; and
a humidity control device disposed on an upstream side of the evaporator in the air conditioning duct,
wherein the humidity control device comprises: a honeycomb structure comprising an outer peripheral wall and partition walls disposed on an inner side of the outer peripheral wall, the partition walls defining a plurality of cells, each of the cells extending from a first end face to a second end face to form a flow path, at least the partition walls being made of a material having a positive temperature coefficient (PTC) property; and a dehumidifying layer formed on a surface of each of the partition walls.

2. The vehicle air conditioning system according to claim 1,
wherein the air conditioning duct has a first path for allowing the air to flow into the evaporator and a second path for discharging the air to a vehicle exterior, between the evaporator and the humidity control device, and
wherein the air conditioning system further comprises a switching valve capable of switching the flow of the air between the first path and the second path.

3. The vehicle air conditioning system according to claim 1, wherein the material having the PTC property has a Curie point of 80 to 200° C.

4. The vehicle air conditioning system according to claim 1, wherein the humidity control device further comprises a pair of electrodes provided on the honeycomb structure.

5. The vehicle air conditioning system according to claim 4, wherein the humidity control device further comprises terminals connected to the pair of electrodes.

6. The vehicle air conditioning system according to claim 1, wherein the material having the PTC property is made of a material comprising barium titanate as a main component, the material being substantially free of lead.

7. The vehicle air conditioning system according to claim 1, wherein the material having the PTC property has a volume resistivity of 0.5 to 30 Ω·cm at 25° C.

8. The vehicle air conditioning system according to claim 1, wherein the honeycomb structure has a thickness of the partition wall of 0.30 mm or less, a cell density of 100 cells/cm$^2$ or less, and a cell pitch of 1.0 mm or more.

9. The vehicle air conditioning system according to claim 1, wherein the honeycomb structure has a thickness of the partition wall of 0.08 to 0.36 mm, a cell density of 2.54 to 140 cells/cm$^2$, and an opening ratio of the cells of 0.70 or more.

10. The vehicle air conditioning system according to claim 1, wherein the dehumidifying layer comprises a dehumidifying material.

11. The vehicle air conditioning system according to claim 1, wherein the dehumidifying layer comprises a functional material having a function of adsorbing carbon dioxide and/or volatile components.

12. The vehicle air conditioning system according to claim 1, wherein the dehumidifying layer comprises a catalyst.

*    *    *    *    *